(12) United States Patent
Kim et al.

(10) Patent No.: US 12,475,966 B2
(45) Date of Patent: Nov. 18, 2025

(54) MEMORY SYSTEM, OPERATING METHOD OF THE SAME, AND CONTROLLER OF MEMORY DEVICE

(71) Applicant: SAMSUNG ELECTRONICS CO., LTD., Suwon-si (KR)

(72) Inventors: Namhyung Kim, Suwon-si (KR); Daejeong Kim, Suwon-si (KR); Dohan Kim, Suwon-si (KR); Deokho Seo, Suwon-si (KR); Jaein Song, Suwon-si (KR); Insu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 18/222,563

(22) Filed: Jul. 17, 2023

(65) Prior Publication Data

US 2024/0038319 A1 Feb. 1, 2024

(30) Foreign Application Priority Data

Jul. 26, 2022 (KR) ................. 10-2022-0092759

(51) Int. Cl.
*G11C 29/02* (2006.01)
*G11C 29/12* (2006.01)
*G11C 29/44* (2006.01)

(52) U.S. Cl.
CPC ............ *G11C 29/44* (2013.01); *G11C 29/027* (2013.01); *G11C 29/1201* (2013.01)

(58) Field of Classification Search
CPC ... G11C 29/44; G11C 29/027; G11C 29/1201; G11C 2029/0409; G11C 2029/1204; G11C 29/24; G11C 29/38; G11C 29/4401; G11C 2029/1202; G11C 29/76; G11C 29/787; G11C 29/808; G06F 3/0658
See application file for complete search history.

(56) References Cited

U.S. PATENT DOCUMENTS

| | | | |
|---|---|---|---|
| 9,870,293 B2 | 1/2018 | Lee et al. | |
| 9,953,725 B2 | 4/2018 | Ryu et al. | |
| 10,546,649 B2 | 1/2020 | Pope et al. | |
| 11,011,251 B1 | 5/2021 | Chen et al. | |
| 2013/0215696 A1 | 8/2013 | Choi et al. | |

(Continued)

FOREIGN PATENT DOCUMENTS

CN 107039083 A 8/2017

OTHER PUBLICATIONS

Extended European Search Report in European Appln. No. 23187846.3, mailed on Mar. 14, 2024, 9 pages.

(Continued)

*Primary Examiner* — Mohammed A Bashar
(74) *Attorney, Agent, or Firm* — Fish & Richardson P.C.

(57) ABSTRACT

A memory system including a memory device that receives a plurality of signals including a post package repair (PPR) command from a host, wherein the memory device includes a memory cell array including a plurality of memory cells connected to a plurality of word lines and a plurality of bit lines, a plurality of redundancy memory cells connected to one or more redundancy word lines and the plurality of bit lines, and anti-fuse memory cells, and a PPR control circuit that transmits to the host whether a PPR operation on a defective memory cell of the memory cell array has passed.

20 Claims, 16 Drawing Sheets

(56) References Cited

U.S. PATENT DOCUMENTS

| | | |
|---|---|---|
| 2016/0307647 A1 | 10/2016 | Morgan et al. |
| 2017/0110206 A1* | 4/2017 | Ryu ................... G11C 29/4401 |
| 2017/0365363 A1 | 12/2017 | Kim |
| 2018/0173595 A1* | 6/2018 | Kim ....................... G06F 11/141 |
| 2018/0181471 A1 | 6/2018 | Panta et al. |
| 2019/0019568 A1 | 1/2019 | Hsu et al. |
| 2019/0019569 A1 | 1/2019 | Pope |
| 2020/0058365 A1 | 2/2020 | Kim et al. |
| 2022/0027229 A1 | 1/2022 | Chao et al. |
| 2022/0066893 A1 | 3/2022 | Wilson et al. |
| 2022/0197739 A1 | 6/2022 | Ryu et al. |
| 2023/0116534 A1* | 4/2023 | Morgan ................ G11C 29/70 |
| | | 714/6.11 |

OTHER PUBLICATIONS

Notice of Allowance in Taiwanese Appln. No. 112127996, mailed on Aug. 20, 2025, 10 pages (with machine translation).

* cited by examiner

| AF_DATA | Master Fuse | FRA15 | | FRA2 | Dirty Fuse |
|---|---|---|---|---|---|
| 1 | 0x00011 | 0x... | ... | 0x... | 0xc00000 |
| ... | ... | ... | ... | ... | ... |
| 0 | 0x00fff | 0x... | ... | 0x... | 0xc00f00 |

BA31

| AF_DATA | Master Fuse | FRA15 | | FRA2 | Dirty Fuse |
|---|---|---|---|---|---|
| 0 | 0x20011 | 0x... | ... | 0x... | 0xe00000 |
| ... | ... | ... | ... | ... | ... |
| 0 | 0x20fff | 0x... | ... | 0x... | 0xe00f00 |

TG points to the second row of BA31.

FIG. 7B

| 1st | 2nd | OUT (ALERT) |
|---|---|---|
| 0 | 0 | ⎯⎤_⎡⎯ Fail |
| 1 | 1 | ⎯⎤_⎡⎯ Fail |
| 0 | 1 | ⎯⎯⎯⎯ Pass |
| 1 | 0 | ⎯⎯⎯⎯ Pass |

MEMORY SYSTEM, OPERATING METHOD OF THE SAME, AND CONTROLLER OF MEMORY DEVICE

CROSS-REFERENCE TO RELATED APPLICATION

A claim of priority under 35 U.S.C. § 119 is made to Korean Patent Application No. 10-2022-0092759, filed on Jul. 26, 2022 in the Korean Intellectual Property Office, the entirety of which is hereby incorporated by reference.

BACKGROUND

The present disclosure relates to memory systems, operating methods of memory systems, and a controller of a memory device, and more particularly to a method of detecting an error occurring sporadically when a post package repair (PPR) operation is performed on a memory device, and solving issues occurring during the PPR operation.

Memory devices typically include a plurality of memory cells arranged in a matrix form including a plurality of rows and a plurality of columns. When defective memory cells occur in the memory device, the defective memory cells may be replaced by redundancy memory cells and a repair operation may be performed to replace a memory row that the defective memory cells are connected to with a redundancy row. A PPR operation may refer to a repair operation in a completed memory device after being packaged.

As the degree of integration of memory devices increases and the manufacturing process becomes finer, single bit defect rate is increasing. As PPR technology for detecting defects in the memory devices further develops, it has become increasingly difficult to detect the case of intermittent errors that occur in the PPR operation on the memory devices.

SUMMARY

Embodiments of the inventive concepts provide a memory system for detecting intermittent errors which occur during a post package repair (PPR) operation, an operating method of the memory system, and a controller of the memory device.

Embodiments of the inventive concepts provide a memory system including a memory device that receives a plurality of signals including a post package repair command from a host. The memory device includes a memory cell array including a plurality of memory cells connected to a plurality of word lines and a plurality of bit lines, a plurality of redundancy memory cells connected to one or more redundancy word lines and the plurality of bit lines, and anti-fuse memory cells; and a PPR control circuit that transmits to the host whether a PPR operation on a defective memory cell of the memory cell array has passed. The PPR control circuit determines a target which is an object of the PPR operation in the memory cell array, compares a data value of the target before the PPR operation with a data value of the target after the PPR operation, and determines whether the PPR operation on the target has passed based on the comparison result.

Embodiments of the inventive concepts further provide an operating method of a memory system. The operating method includes requesting, by a host, a PPR operation on a defective memory cell of a memory cell array from a memory device; performing the PPR operation responsive to the requesting of the PPR operation by the host, wherein the performing of the PPR operation includes determining a target which is an object of the PPR operation from the memory cell array; comparing a data value of the target before the PPR operation and a data value of the target after the PPR operation; and determining a status of the PPR operation as passed or failed based on as result of the comparing.

Embodiments of the inventive concepts still further provide a controller of a memory device, the memory device including a memory cell array and a post package repair (PPR) control circuit, and the controller disposed in a host located remotely from the memory device. The controller generates a PPR command signal requesting a PPR operation on a defective memory of the memory cell array which is a target for the PPR operation; transmits the PPR command signal to the memory device; and receives a performance result of a PPR operation on the target from a PPR control circuit of the memory device responsive to the PPR command signal. The performance result is based on comparison of data values of the target before and after the PPR operation.

BRIEF DESCRIPTION OF THE DRAWINGS

Embodiments will be more clearly understood from the following detailed description taken in conjunction with the accompanying drawings in which:

FIG. 5B illustrates data values of an anti-fuse array according to embodiments of the inventive concepts;

FIG. 7B illustrates a data processing result of a circuit for comparing values of the anti-fuse arrays before and after a PPR operation, and outputting whether the values match, according to embodiments of the inventive concepts;

DETAILED DESCRIPTION OF THE EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
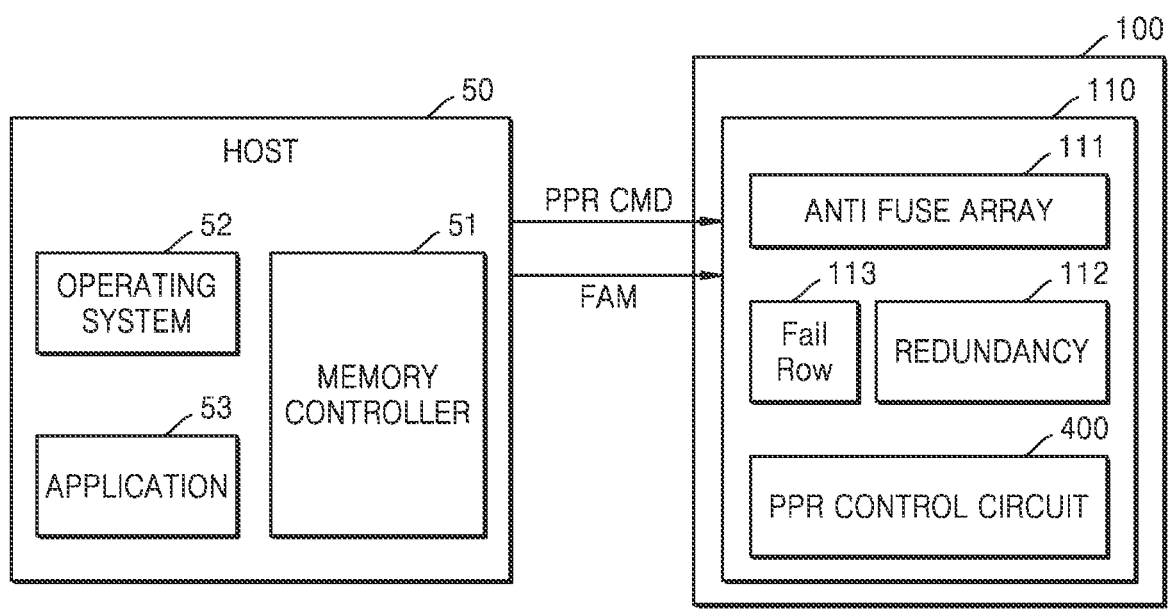
FIG. 1 illustrates a diagram of a memory system including a post package repair (PPR) control circuit according to embodiments of the inventive concepts.

FIG. 1 illustrates a diagram of a memory system 100 including a post package repair (PPR) control circuit, according to embodiments of the inventive concepts.

Referring to FIG. 1, the memory system 100 may perform a write operation or a read operation according to an input/output request of a host 50. The memory system 100 may include a memory device 110.

The host 50 may include processors such as a central processing unit (CPU)/graphics processing unit (GPU) including a memory controller 51 provided in an electronic device such as for example a computer, a notebook computer, a smart phone, a smart pad, a smart TV, and a netbook or other electronic devices. The host 50 may access the memory system 100 in conjunction with an operation of the application 53 under the control of an operating system 52.

The memory system 100 may receive a post package repair PPR of hppr (i.e., PPR/hppr) command from the host 50 and a defective address FAM of the memory device 110 from the host 50 at the request of the host 50. The PPR CMD may be a command to direct the memory device 110 to store the defective address FAM in a non-volatile memory after the memory device 110 is packaged, and to perform a repair operation on the defective address FAM. An hppr command may include a command to direct the memory device 110 to store the defective address FAM in a volatile memory after the memory device 110 is packaged, and to perform a repair operation on the defective address FAM.

The defective address FAM stored in the volatile memory responsive to the hppr command may be permanent. Thus, the repair operation according to the hppr command may be referred to as hard repair, and the repair operation according to the PPR command PPR CMD may be referred to as soft repair. In other words, a hard repair operation may permanently correct information about the defective address FAM, and a soft repair operation may temporarily correct information about the defective address FAM.

The memory device 110 may include a plurality of banks (e.g., see FIG. 5A) including a plurality of memory cells connected to a plurality of word lines and a plurality of bit lines, and a plurality of redundancy memory cells connected to one or more redundancy word lines and the plurality of bit lines. According to other embodiments, the memory device 110 may include a plurality of banks including a plurality of memory cells connected to a plurality of word lines and a plurality of bit lines, and a plurality of redundancy memory cells connected to the plurality of word lines and one or more redundancy bit lines.

The memory device 110 may store the defective address FAM in a non-volatile memory or a volatile memory according to the post package repair (PPR/hppr) command. The memory device 110 may replace a defective word line selected by (or corresponding to) the defective address FAM with a redundancy word line, or may replace a defective bit line selected by (or corresponding to) the defective address FAM with a redundancy bit line.

The memory device 110 may include a PPR control circuit 400, which controls a PPR operation of writing data to the redundancy memory cells connected to a redundancy word line at redundancy 112, which replaces the defective word line (i.e., fail row 113). In this case, the PPR control circuit 400 may compare data values of an anti-fuse array 111 at both before and after (i.e., before/after) the PPR operation, and output whether the data values of the anti-fuse array 111 before/after the PPR operation match each other.

According to an embodiment, the memory device 110 may use the PPR control circuit 400 according to the post package repair (PPR/hppr) command to read data of the memory cells connected to the defective word line selected by the defective address in one bank, may amplify sensing data by using a sense amplifier of the corresponding bank, and may perform an internal bank copy operation so that the sensed and amplified data is written in the redundancy memory cells connected to the redundancy word line.

Figure 2:
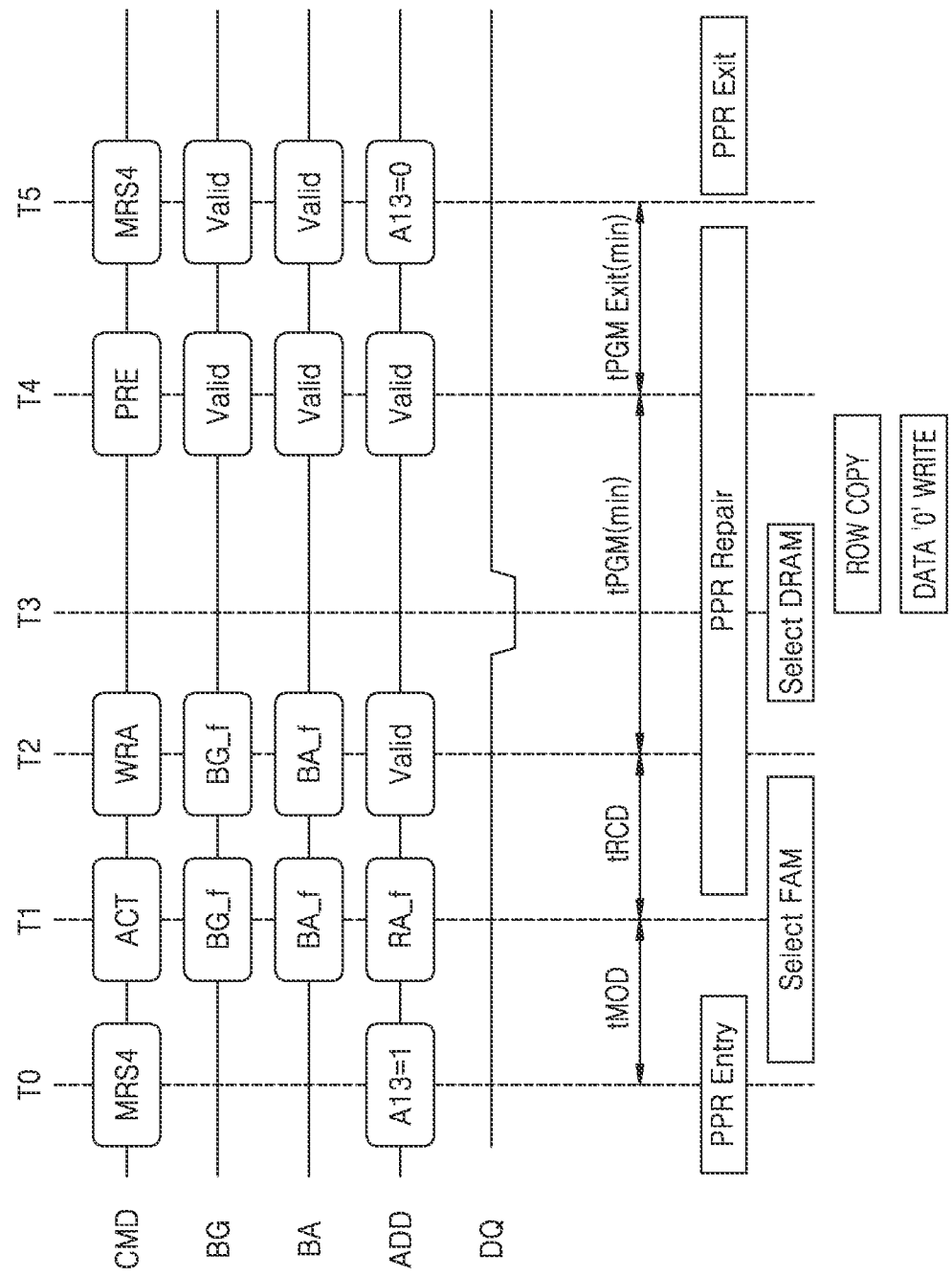
FIG. 2 illustrates a timing diagram of a PPR operation of the memory device in FIG. 1.

FIG. 2 illustrates a timing diagram of a PPR operation of the memory device 110 in FIG. 1. In this case, the memory device 110 may include a low power double data rate (LPDDR) 5 (LPDDR5).

Referring to FIG. 2, at a time point T0, an address signal, for example an A13 address signal, may be input together from the host 50 with a mode register set (MRS) command MRS4 for entering a PPR mode. The mode register set command MRS4 may be used to provide or enable the PPR mode, and as the A13 address signal is input as logic '1', the memory device 110 may enter the PPR mode.

At a time point T1 after a time tMOD from the time point T0, a bank group address BG_f, a bank address BA_f, and a row address RA_f, which indicate a position of the defective memory cell, may be input together with an active command ACT. The bank group address BG_f, the bank address BA_f, and the row address RA_f may refer to or identify the defective address FAM, and the memory device 110 may select the defective address FAM. In the memory device standard, the tMOD time may be defined as the minimum time required between an MRS command and a non-MRS command, and the tMOD time may mean the time required by the memory device 110 to enter the PPR mode.

At a time point T2 after a row address strobe (RAS) to column address strobe (CAS) Delay (RCD) time tRCD from the time point T1, the bank group address BG_f, the bank address BA_f, and a valid address Valid may be input together with the write command WRA. The memory device 110 may not take into consideration the bank group address BG_f, the bank address BA_f, and the valid address Valid input together with the write command WRA. In other words, the memory device 110 may disregard the valid address Valid at this time.

At a time point T3 after a certain time from the time point T2, the memory device 110 may check whether a logic state of a data pad DQ of the memory device 110 is logic '0'. When the data pad DQ is logic '0', the logic state may mean that the memory device 110 is a target. When the data pad DQ is logic '1', the logic state may mean that the memory device 110 is not a target. Being the target may mean that the memory device is targeted or selected to perform the PPR operation among the memory devices inside the memory system 100. The time between the time point T2 and the time point T3 may be a time equivalent to the write latency (WL), and the WL may include CAS write latency (CWL), additive latency (AL), etc.

Figure 6:
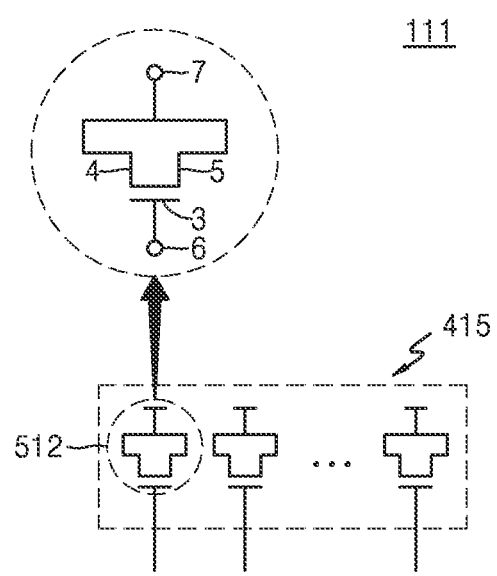
FIG. 6 illustrates an anti-fuse array according to embodiments of the inventive concepts.

When it is identified at the time point T3 that the memory device 110 is a target for PPR operation, the memory device 110 may store the defective address FAM input with the active command ACT in a defective address storage unit (415 in FIG. 6). As will be subsequently described, the defective address storage unit 415 may include a non-volatile memory such as an anti-fuse, and a volatile memory such as a flip-flop. A programming time tPGM may mean a minimum time required for the defective address FAM to be programmed in the non-volatile memory of the defective address storage unit 415.

After all of the defective addresses FAM are programmed into the non-volatile memory of the defective address storage unit 415, at a time point T4 a precharge command PRE may be input, and the memory device 110 may be released from an active state. At a time point T5, the A13 address signal may be input as logic '0' so that the memory device 110 exits from the PPR mode together with the MSR command MRS4. A programming exit time tPGM Exit between the time point T4 and the time point T5 may mean a minimum time required to exit from the PPR mode.

In the PPR operation in FIG. 2, the programming time tPGM required for the defective address FAM to be programmed into the non-volatile memory of the defective address storage unit 415 may require several hundred ms to several seconds s. However, the programming time tPGM of such duration may be determined as a timeout specification violation from the standpoint of the operating system 52 of the host 50. To solve this issue and prevent a timeout specification violation, in some embodiments the memory device 110 may introduce an hppr operation of temporarily storing the defective address FAM in a volatile memory of the defective address storage unit 415, so that the programming time tPGM in the hppr operation may be controlled to be reduced and instead take several tens of ns.

After the PPR/hppr operations described above are performed, a defective memory row corresponding to the defective address FAM stored in the defective address storage unit 415 is replaced with a redundancy row to be saved. However, memory cells connected to the redundancy row may have unknown data stored therein. In this case, the redundancy row, which is intended to save the single bit defect of the defective memory row, may be treated as saving a multi bit defect. To prevent this issue, in some embodiments the memory device 110 may perform a row copy operation and a data '0' or '1' writing operation on the redundancy row by using the PPR control circuit 400.

Figure 3:
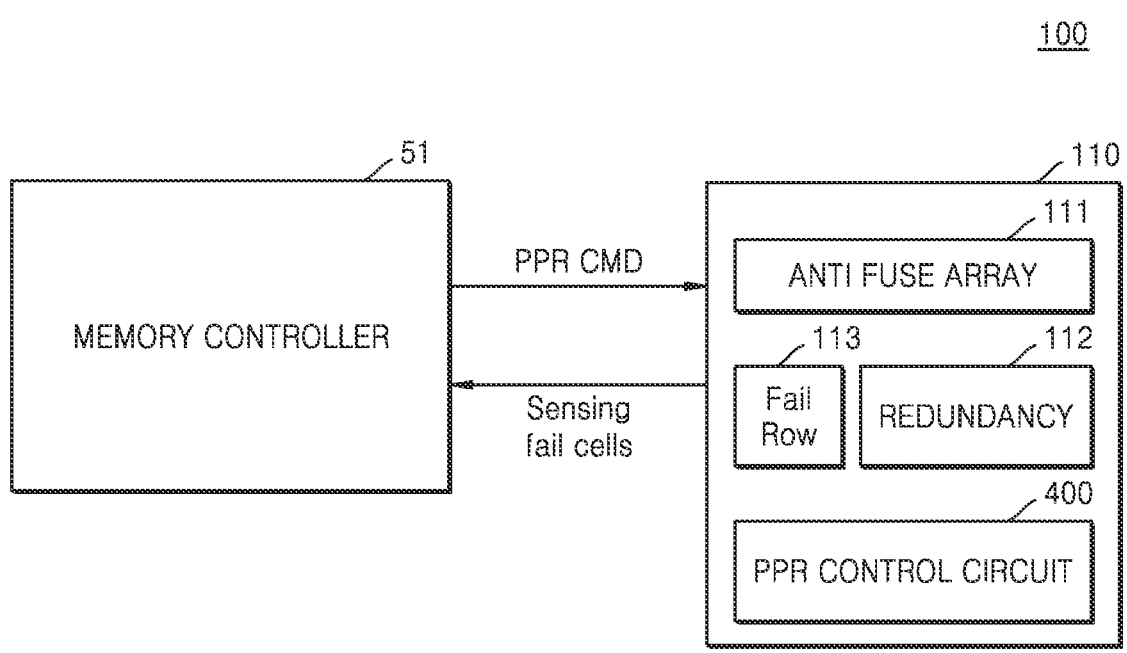
FIG. 3 illustrates a block diagram of a memory system according to embodiments of the inventive concepts.

FIG. 3 illustrates a block diagram of a memory system 100 according to embodiments of the inventive concepts.

Referring to FIG. 3, the memory system 100 according to embodiments may include the memory device 110 and the memory controller 51. In this embodiment, the memory controller 51 is disposed in the memory system 100 instead of in the host 50 as shown in FIG. 1. The memory device 110 receives the PPR command PPR_CMD from the memory controller 51. In addition, the memory device 110 may include an anti-fuse array 111, a redundancy memory cell (redundancy) 112, a fail row region (fail row) 113, and the PPR control circuit 400.

The memory controller 51 may receive from the PPR control circuit 400 a result of whether the PPR operation has passed (e.g., "Sensing fail cells" as shown), and may determine whether there is a defect in the memory cell array in the memory device 110. The memory controller 51 may transmit a signal PPR CMD of the host 50 to the memory device 110. In addition, the memory controller 51 may process a plurality of signals.

In addition, the memory device 110 may receive the PPR command PPR_CMD from the memory controller 51, determine a target TG which is a target of the PPR operation in the anti-fuse array 111, and store data values before and after the PPR operation of the target TG. The memory device 110 may compare the data value before the PPR operation with the data value after the PPR operation with respect to the target TG. For example, when the data value before the PPR operation is '0' and the data value after the PPR operation is changed to '1', the memory controller 51 may determine that a normal PPR operation has been performed. On the other hand, for example when the data value before performing the PPR operation of the target TG is '0' and the data value after the PPR operation has not been changed to '1', the memory controller 51 may determine that the PPR operation has failed. In this case, when it is determined that the PPR operation has failed, the memory device 110 may transmit a post package failure signal to the memory controller 51. When the post package failure signal is received, the memory controller 51 may transmit a command signal to perform the post package repair operation again to the memory device 110. A control process for the case when the PPR operation fails will be described in detail with reference to FIGS. 9 and 10.

The memory device 110 may include the PPR control circuit 400. The PPR control circuit 400 may include a first transistor receiving a data value before the PPR operation of the target TG, and a second transistor receiving a data value after the PPR operation of the target TG (e.g., see FIG. 7A). In this case, the data value before the PPR operation may be defined as a first signal 1st DATA, and the data value after the PPR operation of the target TG may be defined as a second signal 2nd DATA. The PPR control circuit 400 may compare the data values of the anti-fuse array 111 included in the first signal 1st DATA and the second signal 2nd DATA, and determine whether the PPR operation is successful based on the comparison result. In addition, the PPR control circuit 400 may include a logic gate for comparing data values of the anti-fuse array 111 included in the first signal 1st DATA and the second signal 2nd DATA, and in this case, the logic gate may include an XOR gate. However, the type of the logic gate is not limited thereto, and in other embodiments other configurations of logic gate(s) may be used in the PPR control circuit 400 to compare the data values.

The memory device 110 may include a plurality of memory cell arrays. For example, the memory device 110 may include the anti-fuse array 111, the redundancy 112, and the fail row 113.

The anti-fuse array 111 may include memory cells having electrical characteristics opposite to those of a fuse element, and may include resistive fuse elements having a high resistance value in an un-programmed state while having a low resistance value in a programmed state. The memory cells of the anti-fuse array 111 may be generally configured in a form in which a dielectric is inserted between conductors, and the memory cells of the anti-fuse array may be programmed by destroying the dielectric between the two conductors by applying a high voltage via the conductors at both ends thereof. As a result of such programming, the conductors at both ends of the anti-fuse array memory cell may be short-circuited and a low resistance value may be created between the conductors at the both ends. On the other hand, memory cells having different electrical characteristics from the electrical characteristics of the anti-fuse array 111 may be defined as normal fuses. In addition, a memory cell region including the normal fuses may be defined as a normal fuse array. In some embodiments the PPR operation may be performed on normal fuse memory cells of a normal fuse array, the normal fuse memory cells having different electrical characteristics than the anti-fuse memory cells. The configuration of the memory cells (i.e., the anti-fuse memory cells) of the anti-fuse array 111 will be described in detail with reference to FIG. 6.

The redundancy 112 may refer to a memory cell available to replace (i.e., for replacing) the defective word line. The memory device 110 may include a plurality of banks including a plurality of memory cells connected to a plurality of word lines and a plurality of bit lines, and a plurality of redundancy memory cells connected to one or more redundancy word lines and the plurality of bit lines. According to other embodiments, the memory device 110 may include a plurality of banks including a plurality of memory cells connected to a plurality of word lines and a plurality of bit lines, and a plurality of redundancy memory cells connected to the plurality of word lines and one or more redundancy bit lines.

The fail row 113 may refer to a region of the memory cells which cannot be used due to defects. The fail row 113 may be replaced with a region of the redundancy 112 by using the PPR operation.

In addition, the memory device 110 may transmit to the memory controller 51 whether the PPR operation fails as a result of performing the PPR operation.

Figure 4:
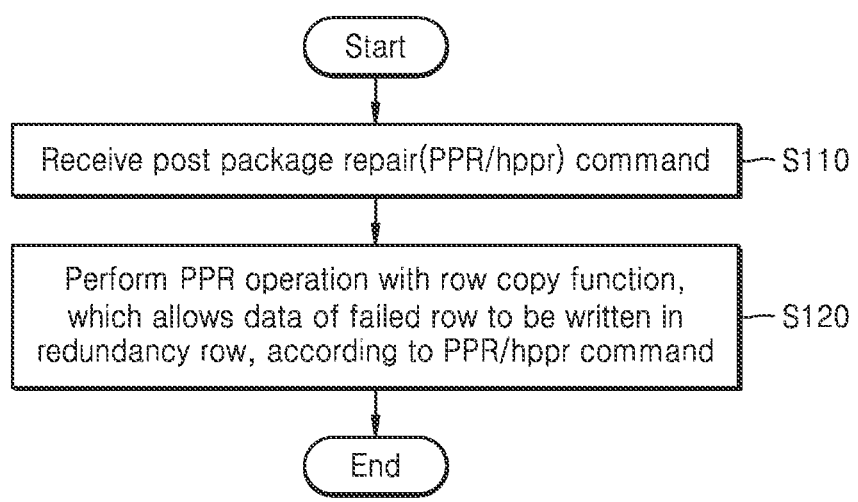
FIG. 4 illustrates a flowchart of a PPR operation of a memory system according to embodiments of the inventive concepts.

FIG. 4 illustrates a flowchart of the PPR operation of the memory system 100, according to embodiments of the inventive concepts.

Referring to FIG. 4, the memory device 110 may receive the PPR or the hppr command from the memory controller 51 (S110). The PPR or hPPR (PPR/hPPR) command may direct that the defective address FAM of the memory device 110 provided by the memory controller 51 is to be stored in the defective address storage unit (415 in FIG. 6). The PPR/hPPR command may be determined according to an interface scenario between the host 50 and the memory system 100.

The PPR control circuit 400 may perform the PPR operation according to the PPR/hPPR command (S120). The PPR control circuit 400 may identify whether the memory device 110 itself is the target TG by identifying from the write command an entrance to the PPR mode of the memory device 110, selecting the defective address FAM together with an active command, receiving a write command, and the logical value of data at the data pad DQ. When the memory device 110 itself is identified as the target TG, the PPR control circuit 400 may program the defective address FAM that has been applied together with the active command in the defective address storage unit 415, receive the precharge command after the completion of the programming, and perform the PPR operation so that an operation of exiting from the PPR mode is performed. The PPR control circuit 400 may further perform a row copy operation on the redundancy row for replacing a defective row, in addition to the aforementioned PPR operation.

Figure 5A:
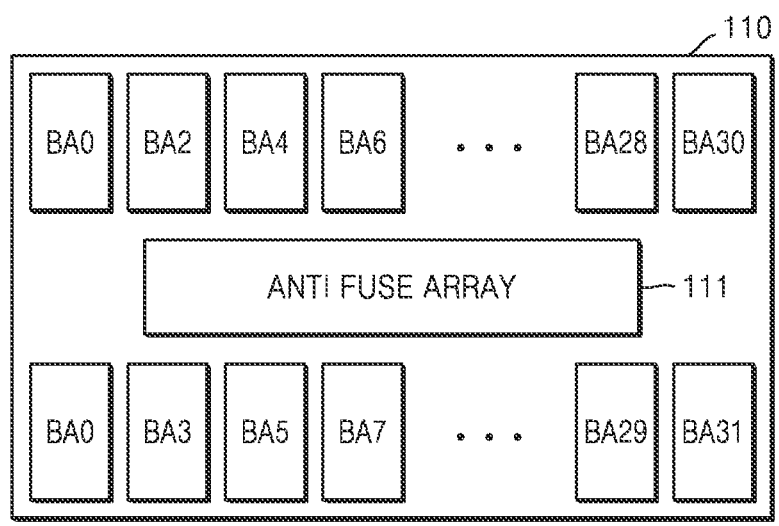
FIG. 5A illustrates a block diagram of a memory device according to embodiments of the inventive concepts.

FIG. 5A illustrates a block diagram of a memory cell array of the memory device 110, according to embodiments of the inventive concepts. FIG. 5B illustrates data values of the anti-fuse array according to embodiments of the inventive concepts.

Referring to FIG. 5A, the memory device 110 may include banks BA0, BA1, BA2, . . . , and BA31 including the defective memory cells. In this case, the number of banks is not limited to the number shown in FIG. 5A. In addition, as described above, the memory device 110 may include the anti-fuse array 111. In this case, the anti-fuse array 111 may store PPR information about the banks in the memory device 110.

Referring to FIG. 5B, a PPR control circuit according to embodiments may store anti-fuse data AF_DATA in advance by utilizing a master fuse, that is data indicating a position of a defective cell, row address data FRA2, . . . , and FRA15 of the defective memory cells, and dirty fuse data indicating whether a memory cell is defective, and may utilize the anti-fuse data AF_DATA as data for determining whether the PPR operation has passed.

For example, the PPR control circuit 400 may determine a first bank BA0 and a second bank BA31 of the memory device 110 as the target TG. In this case, the PPR control circuit 400 may compare the data value before the PPR operation with the data value after the PPR operation with respect to the target TG, and when the data value before the PPR operation is '0' and the data value after the PPR operation is changed to '1', the PPR control circuit 400 may transmit information about the changed data value to the memory controller 51, and determine that the normal PPR operation has been performed. On the other hand, when the data value before the PPR operation of the target TG is '0', and the data value after the PPR operation has not been changed to '1', the PPR control circuit 400 may transmit information about the unchanged data value to the memory controller 51, and determine that the PPR operation has failed.

For example, when it is determined that the data value before the PPR operation and the data value after the PPR operation have been changed from '0' to '1' with respect to the first bank BA0 of the memory device 110, the PPR control circuit 400 may transmit information about the changed data values to the memory controller 51, and the memory controller 51 may determine that the normal PPR operation has been performed. However, when it is determined that the data value before the PPR operation and the data value after the PPR operation have not been changed from '0' to '1' with respect to the first bank BA0 of the memory device 110, the PPR control circuit 400 may transmit information about the unchanged data values to the memory controller 51, and the memory controller 51 may determine that the normal PPR operation has failed.

The memory cell array may include one or more banks BA0, . . . , and BA31, and each of the banks BA0, . . . , and BA31 may include a plurality of word lines, a plurality of memory cells connected to the plurality of word lines, and a plurality of redundancy memory cells connected to one or more redundancy word lines and the plurality of bit lines. Memory cells (MC) and the redundancy memory cells may be accessed by using a common column address by sharing the bit lines.

FIG. 6 illustrates an anti-fuse array 111 according to embodiments of the inventive concepts.

Referring to FIG. 6, as described above, an anti-fuse 512 may be generally configured in a form in which a dielectric material is inserted between conductors. The anti-fuse 512 may be programmed by applying a high voltage via the conductors at both ends thereof that destroys the dielectric material between both conductors. As a result of such programming, the conductors at both ends of the anti-fuse 512 may be short-circuited, and a low resistance value may be created between the conductors at both ends.

The anti-fuse 512 may include a depletion type metal-oxide-semiconductor (MOS) transistor in which a source 4 and a drain 5 are connected to each other. In the initial state, the resistance between a first node 6 connected to a gate electrode 3 and a second node 7 commonly connected to the source 4 and the drain 5 may be large, because the first node 6 and the second node 7 are separated by a gate oxide layer. Accordingly, the first node 6 and the second node 7 may be in a non-conductive state. For example, the non-conductive state may be set to an un-programmed state, or logic 'low'.

The gate oxide layer of the anti-fuse 512 may be destroyed or rendered in a state of break-down by applying a break-down voltage between the first node 6 and the second node 7, and may be irreversibly changed from the non-conductive state to a conductive state. When the gate oxide layer is destroyed, the resistance between the first node 6 and the second node 7 may decrease. This conductive state may be set to the programmed state, or logic 'high'. The time required to destroy and program the gate oxide layer of the anti-fuse 512 may correspond to the programming time tPGM in FIG. 2.

To reduce the programming time tPGM that is in a range of hundreds of milliseconds (ms) to several seconds (s) required to program the defective address FAM in the non-volatile memory of the defective address storage unit 415, the PPR control circuit 400 in some embodiments may support an hPPR operation. In the hppr operation the defective address FAM is temporarily stored in the volatile memory of the defective address storage unit 415, and a programming time tPGM of about tens of nanoseconds (ns) may instead be realized.

According to other embodiments, a non-volatile memory of the defective address storage unit 415 may be implemented as one of non-volatile memories such as an E-fuse array, NAND flash memory, NOR flash memory, magnetic random access memory (RAM) (MRAM), spin-transfer-torque MRAM (STT-MRAM), resistive RAM (ReRAM), and phase change RAM (PRAM).

Figure 7A:
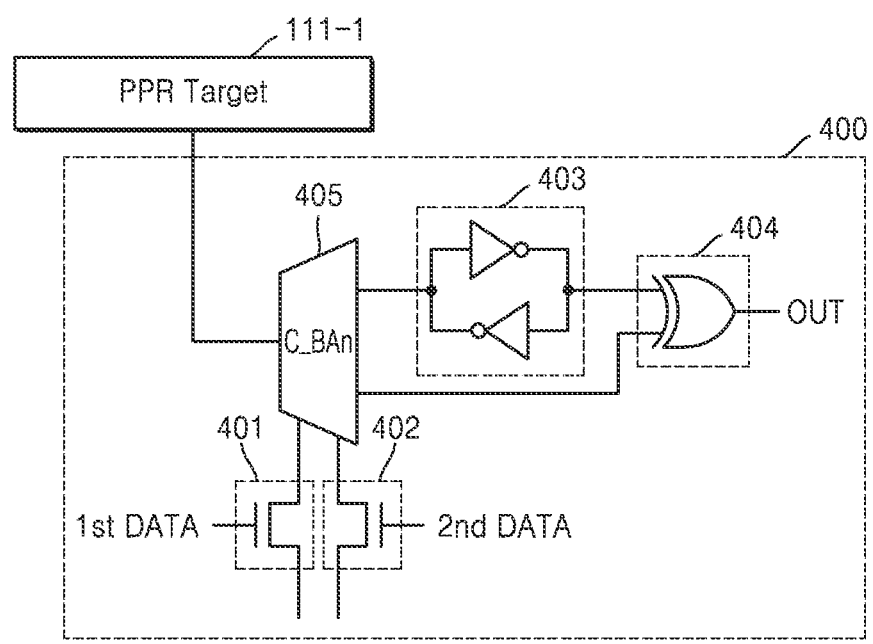
FIG. 7A illustrates a circuit for comparing values of anti-fuse arrays before and after a PPR operation, and outputting whether the values match, according to embodiments of the inventive concepts.
Figure 7B:
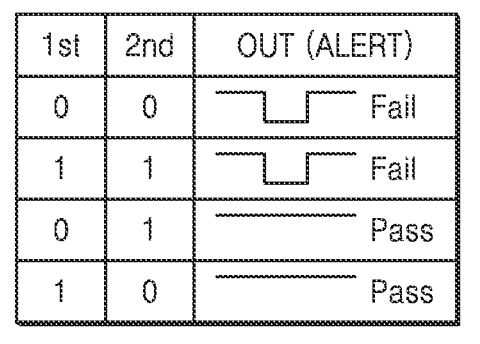

FIG. 7A illustrates the PPR control circuit 400 according to embodiments of the inventive concepts, and FIG. 7B illustrates a data processing result of the PPR control circuit 400 according to the embodiments of the inventive concepts.

Referring to FIG. 7A, the PPR control circuit 400 according to embodiments may include a first transistor 401 and a second transistor 402, which respectively receive the first and second control signals 1st DATA and 2nd DATA which identify data stored in a PPR target 111-1 of the anti-fuse array 111. In addition, the PPR control circuit 400 may include a latch circuit 403, a logic gate 404, and a receiving circuit (C_BAn) 405.

In this case, the first signal 1st DATA may be the data value before the PPR operation is performed on the PPR target 111-1, and the second signal 2nd DATA may be the data value after the PPR operation is performed on the PPR target 111-1. In addition, the first signal 1st DATA or the second signal 2nd DATA may be read from the PPR target 111-1 of the anti-fuse array 111, and transmitted to the C_BAn 405. When at least one of the first signal 1st DATA or the second signal 2nd DATA is input to the C_BAn 405, the first signal 1st DATA or the second signal 2nd DATA may be processed by the C_BAn 405, and transmitted to a first transistor 401 or a second transistor 402, respectively. For example, the C_BAn 405 may convert the data value received from the PPR target 111-1 into a control signal, which identifies whether the received signal is the first signal 1st DATA or the second signal 2nd DATA, and transmit the control signal to the first transistor 401 or the second transistor 402, respectively.

In this case, the C_BAn 405 may include a multiplexer circuit (not shown) which receives data of the target TG from the PPR target 111-1 of the anti-fuse array 111, and processes the first signal 1st DATA or the second signal 2nd DATA. The outputs of the first and second transistors 401 and 402 may control switching of the multiplexer.

In addition, the PPR control circuit 400 may compare a first input (i.e., data value before the PPR operation) with a second input (i.e., data value after the PPR operation), and based on the comparison result, the memory controller 51 may determine whether the PPR operation has passed. The PPR control circuit 400 may include the logic gate 404 for comparing the first input with the second input. The C_BAn 405 may receive the data value from the PPR target 111-1, and utilize the received data value as an input to the PPR control circuit 400. The latch circuit 403 may be connected to the input of the logic gate 404, and may store the data value before the PPR operation of the target TG.

The C_BAn 405 according to embodiments of the inventive concepts as described above may generate a control signal for identifying whether the input signal is a signal including data before the PPR operation or a signal including data after the PPR operation, and may transmit the control signal to the first transistor 401 or the second transistor 402, respectively. For example, when the first signal 1st DATA is input, the C_BAn 405 may store the first signal 1st DATA in the latch circuit 403. When the first signal 1st DATA is stored in the latch circuit 403, the latch circuit 403 may store the data before the PPR operation from the anti-fuse array 111. In addition, when the second signal 2nd DATA is input, the C_BAn 405 may transmit the information input by the anti-fuse array 111 to the logic gate 404, and the PPR control circuit 400 may compare the data before the PPR operation with the data after the PPR operation with respect to the anti-fuse array 111, and determine whether the PPR operation has passed. In this case, the logic gate 404 may include an XOR gate. However, the type of the logic gate is not limited thereto, and in other embodiments other configuration of logic gate(s) may be used for comparison in the PPR control circuit 400.

Referring to FIG. 7B, the PPR control circuit 400 may receive the first signal 1st DATA and the second signal 2nd DATA having values of four different combinations or cases. The PPR control circuit 400 may determine whether the PPR operation has passed based on the input signals, and transmit data on whether the PPR operation has passed to the memory controller 51.

When the first signal 1st DATA according to the embodiment is '0' and the second signal 2nd DATA is '0', the PPR control circuit 400 may determine that there is no change in the data value before and after the PPR operation, and that the PPR operation has failed. In addition, when the first signal 1st DATA according to the embodiment is '1' and the second signal 2nd DATA is '1', the PPR control circuit 400 may determine that there is no change in the data value before and after the PPR operation, and that the PPR operation has failed.

When the first signal 1st DATA according to the embodiment is '0' and the second signal 2nd DATA is '1', the PPR control circuit 400 may determine that there is a change in the data value before and after the PPR operation, and that the PPR operation has passed. In addition, when the first signal 1st DATA according to the embodiment is '1' and the second signal 2nd DATA is '0', the PPR control circuit 400 may determine that there is a change in the data value before and after the PPR operation, and that the PPR operation has passed.

Referring to FIG. 7A again, the PPR control circuit 400 may generate a failure signal Alert of the PPR operation as the signal OUT of logic gate 404, based on the comparison result of the first signal 1st DATA with the second signal 2nd DATA. When it is determined that the first signal 1st DATA is the same as the second signal 2nd DATA, the PPR control circuit 400 may generate the failure signal Alert of the PPR operation, and transmit the failure signal Alert of the PPR operation to the memory controller 51. When the memory controller 51 receives the failure signal Alert of the PPR operation, the memory controller 51 may control the memory system 100 to perform the PPR operation again. A process of performing the PPR operation will be described in detail with reference to FIGS. 9 and 10.

Figure 8:
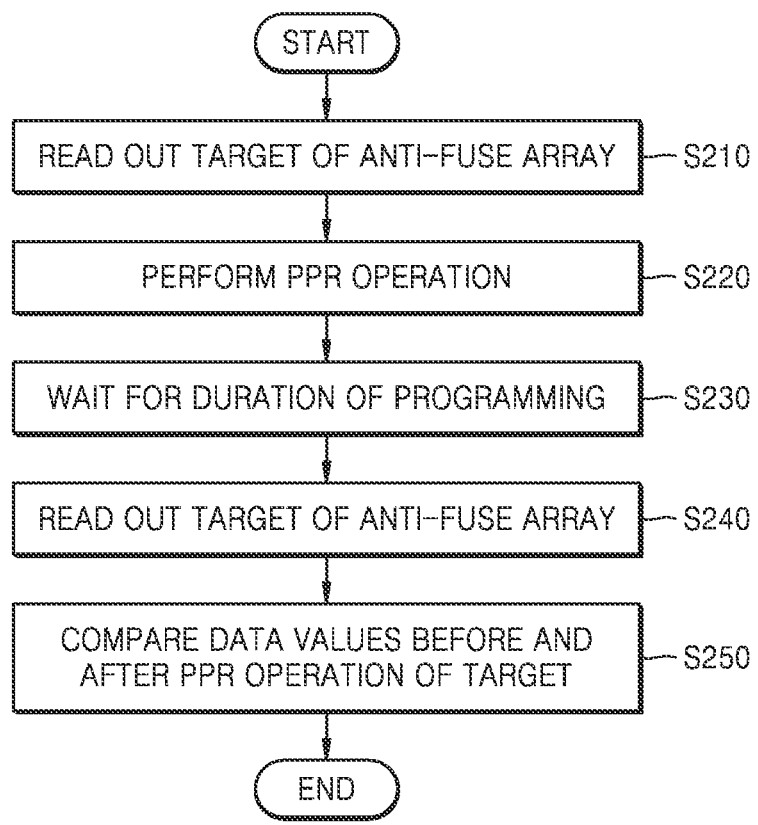
FIG. 8 illustrates a flowchart of a process of detecting errors in a PPR operation, according to embodiments of the inventive concepts.

FIG. 8 illustrates a flowchart of a process of detecting errors in the PPR operation, according to embodiments of the inventive concepts.

Referring to FIG. 8, data of the target TG of the anti-fuse array 111 may be read out by the PPR control circuit 400 of the memory system 100 (S210).

In this case, the target TG may be determined from the banks BA included in the anti-fuse array 111, and each of the banks BA may be a target candidate.

When the target is determined, the memory controller 51 may control the memory device 110 so that the PPR operation is performed by the memory device 110 (S220). Here, the memory controller 51 may receive and store in advance the data value before the PPR operation of the target TG from the PPR control circuit 400.

When the PPR operation is performed, the memory controller 51 may wait for a duration of the programming time tPGM (S230).

As described above, the programming time tPGM may be a minimum time required for the defective address FAM to be programmed in the non-volatile memory of the defective address storage unit 415.

When a wait duration time for the programming time tPGM is over, the data of the target TG of the anti-fuse array 111 may be read out once again by the PPR control circuit 400 of the memory system 100 (S240).

When the programming time tPGM is over and the PPR operation is performed, the memory controller 51 may compare the data values before and after the PPR operation of the target TG (S250).

The memory controller 51 may determine the target TG by selecting one from defective memory cell candidate groups BA1, BA2, ..., and BAn in the memory cell array. The memory controller 51 may receive a result of comparing the data value before the PPR operation with the data value after the PPR operation with respect to the target TG from the PPR control circuit 400, and when for example the data value before the PPR operation is '0' and the data value after the PPR operation is changed to '1', the memory controller 51 may determine that the normal PPR operation has been performed. On the other hand, when for example the data value before performing the PPR operation of the target TG is '0' and the data value after the PPR operation has not been changed to '1', the memory controller 51 may determine that the PPR operation has failed. In this case, when it is determined that the PPR operation has failed, the PPR control circuit 400 may transmit a post package failure signal to the memory controller 51 included in the host 50. When the post package failure signal is received, the host 50 may, by using the memory controller 51, transmit a command signal so that the post package repair operation is performed again by the memory system 100.

Figure 9:
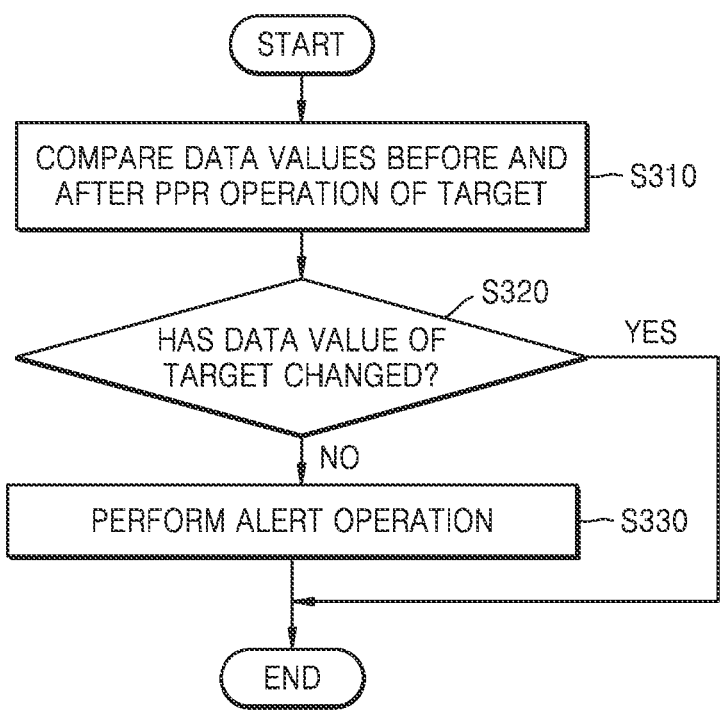
FIG. 9 illustrates a flowchart of a process of performing an alert operation after the PPR operation, according to embodiments of the inventive concepts.

FIG. 9 illustrates a flowchart of a process of performing an Alert operation after the PPR operation, according to embodiments of the inventive concepts.

Referring to FIG. 9, the PPR control circuit 400 may compare the data values before and after the PPR operation of the target TG (S310).

After the data values before and after the PPR operation of the target TG are compared, the PPR control circuit 400 may determine whether the data value of the target TG has changed (S320). When it is determined that the data value of the target TG has changed (Yes at S320), the PPR control circuit 400 may determine that the PPR operation has passed (or in other words the status of the PPR operation is "passed"), and may terminate a verification process of the PPR operation.

However, when it is determined that the data value of the target TG has not changed (No at S320), the PPR control circuit 400 may determine that the PPR operation has failed (or in other words that the status of the PPR operation is "failed"), and may perform the failure signal alert operation (S330). For example, when it is determined that the data value of the target TG has not changed after the PPR operation, the PPR control circuit 400 may transmit the failure signal Alert to the host 50. When the failure signal Alert is received, the host 50 may control the PPR operation to be performed again in the memory system 100, and the process of performing the PPR operation again is described in detail with reference to FIG. 10.

Figure 10:
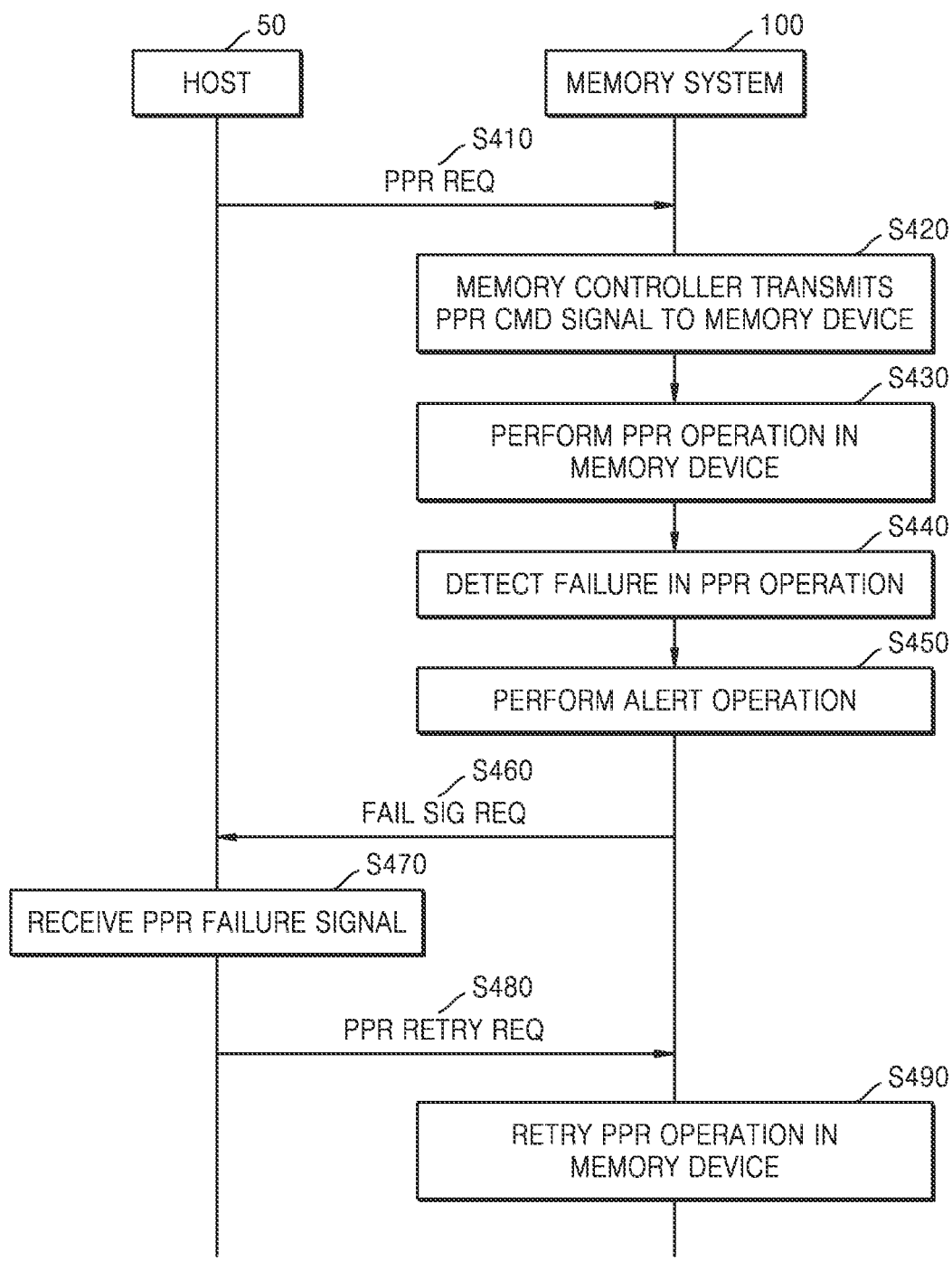
FIG. 10 illustrates a flowchart of a process of performing the PPR operation again, according to embodiments of the inventive concepts.

FIG. 10 illustrates a flowchart of a process of performing the PPR operation, according to embodiments of the inventive concepts. The description of FIG. 10 may be taken together with FIG. 3 which includes memory controller 51 as disposed in memory system 100.

Referring to FIG. 10, the host 50 may transmit a first PPR operation request operation signal PPR REQ to the memory system 100 (S410).

When a command signal requesting the PPR operation, or the PPR operation request signal PPR REQ, is received, the memory system 100 may perform the PPR operation under control of the memory controller 51.

For example, the memory controller 51 may convert the PPR operation request signal PPR REQ of the host 50 into the PPR operation command signal PPR CMD, and transmit the PPR operation command signal PPR CMD to the memory device 110 (S420).

When the PPR operation command signal PPR CMD is received, the memory device 110 may perform the PPR operation (S430). In this case, the process of performing the PPR operation may be the same as described above with reference to FIGS. 8 and 9.

When the PPR operation is completed, the memory controller 51 may detect whether the PPR operation has failed (S440).

As described with reference to FIGS. 8 and 9, when it is determined that the data value of the target TG before and after the PPR operation has not changed, the PPR control circuit 400 may determine that the PPR operation has failed, and may then perform the alert operation (S450).

The alert operation may begin when the PPR control circuit 400 transmits a failure signal FAIL SIG REQ of the PPR operation to the host 50 (S460).

When the failure signal FAIL SIG REQ of the PPR operation is received (S470), the host 50 may transmit a PPR operation retry request signal PPR RETRY REQ to the memory system 100 (S480).

When the PPR operation retry request signal PPR RETRY REQ is received, the memory system 100 may retry the PPR operation in the PPR control circuit 400 under the control of the memory controller 51 (S490). In this case, the retried PPR operation may be the same as the processes in FIGS. 8 and 9.

Figure 11:
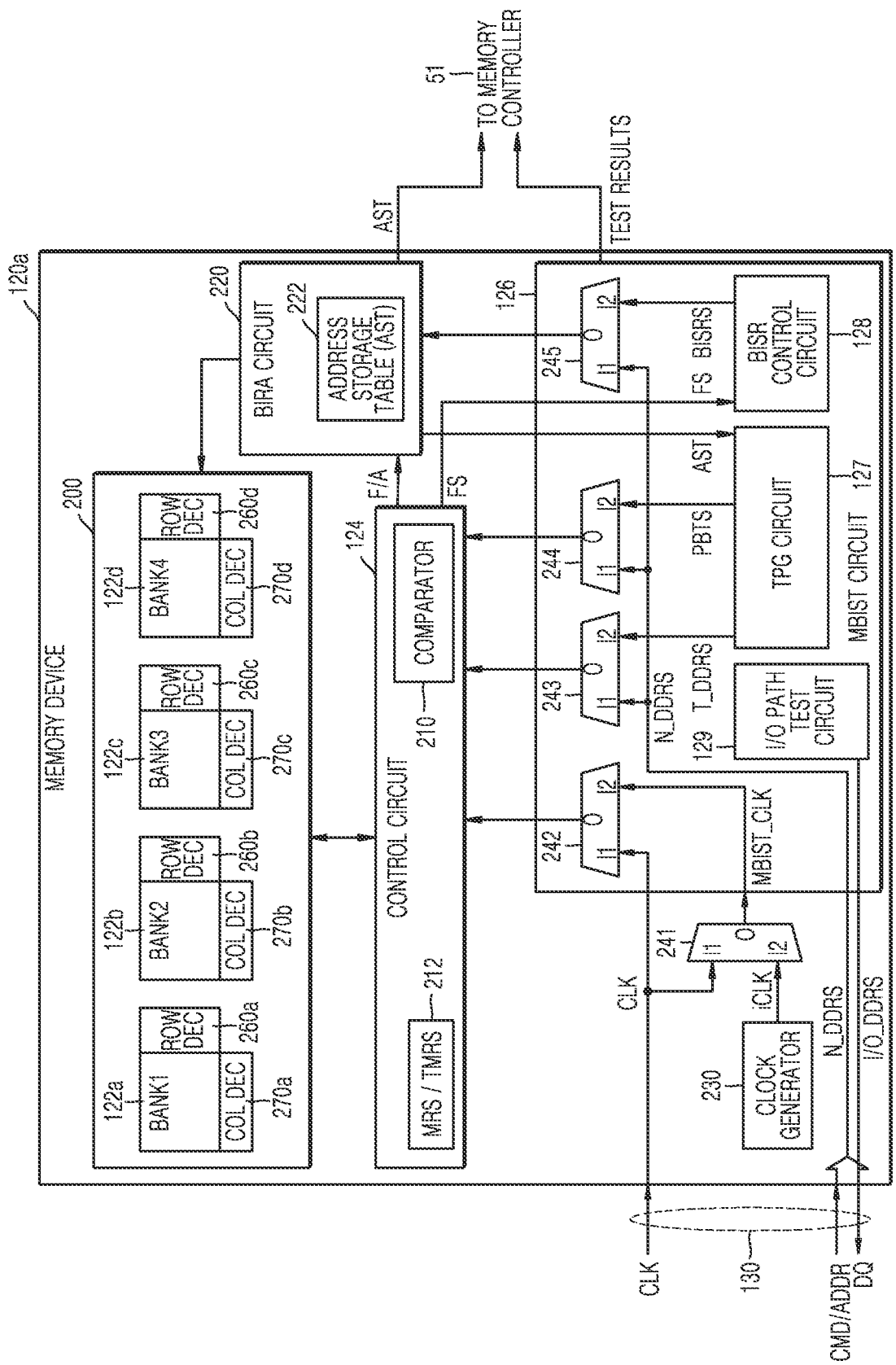
FIG. 11 illustrates a block diagram of another example of a memory device in the memory system of FIG. 1, according to embodiments of the inventive concepts.

FIG. 11 illustrates a block diagram of another example of the memory device 110 in the memory system 100 of FIG. 1, according to embodiments of the inventive concepts.

A memory device 120a of FIG. 11 may differ from the memory device 110 of FIG. 1 in that a memory built-in self-test (MBIST) circuit 126 includes an input/output path test circuit 129. The description of the memory device 110 in FIG. 1 given above may also be applied to the memory device 120a of FIG. 11, such that description of structure and functionality of memory device 120a of FIG. 11 that is the same or similar to that of memory device 110 may be omitted for the sake of brevity.

Referring to FIG. 11, the MBIST circuit 126 may test memory interfacing of physical layers interconnected between the memory device 120a and the memory controller 51. The MBIST circuit 126 may include an input/output (I/O) path test circuit 129 which tests an I/O path from host 50 including signal lines connecting to pins of the memory interface 130. Double data rate (DDR) input/output signals I/O DDRS for transmitting uni-directional single-signal information or transmitting bi-directional data may be transceived to/from the signal lines.

The I/O path test circuit 129 may provide a DDR test result of the memory device 120a as the DDR input/output signals I/O DDRS. The I/O path test circuit 129 may test architectural requirements of a memory physical layer (PHY) by using the DDR input/output signals I/O DDRS. The architectural requirements of the memory PHY may include direct current (DC) parameters, such as a voltage level, a rise time and a fall time of an input/output signal, and alternate current (AC) parameters, such as a memory access time, a setup time and a hold time of the output signal.

In addition, the memory system 100 may include a plurality of dynamic random access memory (RAM) (DRAM). An access point (AP) may communicate by setting DRAM interface protocol for controlling the DRAMs by setting a command and a mode register (MRS) in accordance with the Joint Electron Device Engineering Council (JEDEC) standard, or for using unique functions of an enterprise, such as low voltage, high speed, and reliability, and cyclic redundancy check (CRC)/error correction code (ECC) functions. For example, the AP may communicate with DRAM via interfaces that meet the Joint Electron Device Engineering Council (JEDEC) standards, such as low power double data rate (LPDDR) 4 (LPDDR4) and LPDDR 5 (LPDDR5), and may communicate by setting new DRAM interface protocols for controlling DRAM for acceleration, which have higher bandwidth than DRAM including accelerator blocks or accelerator chips.

Figure 12:
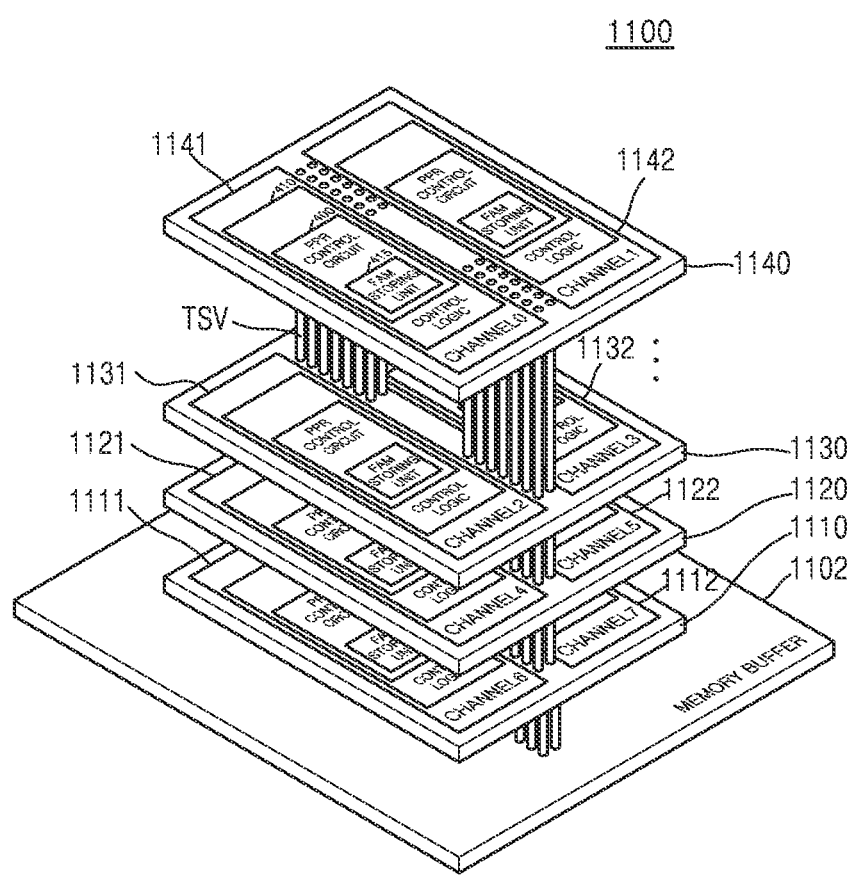
FIG. 12 illustrates a diagram of a multi-chip package including a PPR control circuit, according to embodiments of the inventive concepts.

FIG. 12 illustrates a diagram of a multi-chip package 1100 including the PPR control circuit 400, according to embodiments of the inventive concepts.

The multi-chip package 1100 may include a semiconductor package, in which a plurality of semiconductor chips or various types of semiconductor chips are stacked and implemented as one package. Referring to FIG. 12, the multi-chip package 1100 may include a memory buffer 1102 under lower ends of memory layers 1110, 1120, 1130, and 1140, which are stacked. The memory layers 1110, 1120, 1130, and 1140 may constitute a plurality of independent interfaces that may be characterized as channels. Each of the memory layers 1110, 1120, 1130, and 1140 may constitute a pair of channels 1111-1112, 1121-1122, 1131-1132, and 1141-1142, respectively. Each of the pair of channels 1111, 1112, 1121, 1122, 1131, 1132, 1141, and 1142 may include independent memory banks, and may be independently clocked.

In the embodiment shown in FIG. 12, the semiconductor device 1100 may provide an example in which four memory layers 1110, 1120, 1130, and 1140 are stacked to constitute eight channels. According to other embodiments, two to eight memory layers may be stacked in the semiconductor device 1100. According to further embodiments, each of the memory layers 1110, 1120, 1130, and 1140 may include one or four channels. According to still further embodiments, one single channel may be distributed to the memory layers 1110, 1120, 1130, and 1140, which is a plural.

The memory buffer 1102 may receive a command, an address, a clock, and data from the memory controller (e.g., memory controller 51 in FIG. 1), and provide a signal distribution function for providing the received command, address, clock, and data to the memory layers 1110, 1120, 1130, and 1140. Because the memory buffer 1102 buffers all of the command, address, clock, and data, the memory controller 51 may interface with the memory layers 1110, 1120, 1130, and 1140 by driving only the load of the memory buffer 1102.

The memory buffer 1102 may transceive signals with the memory layers 1110, 1120, 1130, and 1140 via through silicon vias TSV. The memory buffer 1102 may communicate with an external memory controller via a conductive conductor such as for example a solder ball formed on an external surface of the semiconductor device 1100.

Each of the pair of the channels 1111, 1112, 1121, 1122, 1131, 1132, 1141, and 1142 of the memory layers 1110, 1120, 1130, and 1140 may include a PPR control circuit such as PPR control circuit 400 shown in channel 1141. Each of the pair of the channels 1111, 1112, 1121, 1122, 1131, 1132, 1141, and 1142 may store the defective address FAM in a defective address storage unit such as defective address storage unit 415 shown in channel 1141 according to the post package repair (PPR/hppr) command by using the PPR control circuit 400. The defective address storage unit 415 may include a non-volatile memory or a volatile memory. The PPR control circuit 400 may perform the PPR operation of writing data in the redundancy memory cells connected to the redundancy word line replacing the defective word line selected by a defective row address, or writing data in the redundancy memory cells connected to the redundancy word line replacing the defective word line selected by a defective column address. In the redundancy memory cells, data of the memory cells connected to the defective word line may be written by performing an internal bank copy operation or an inter-bank copy operation, or data '0' or data '1' may be written.

Figure 13:
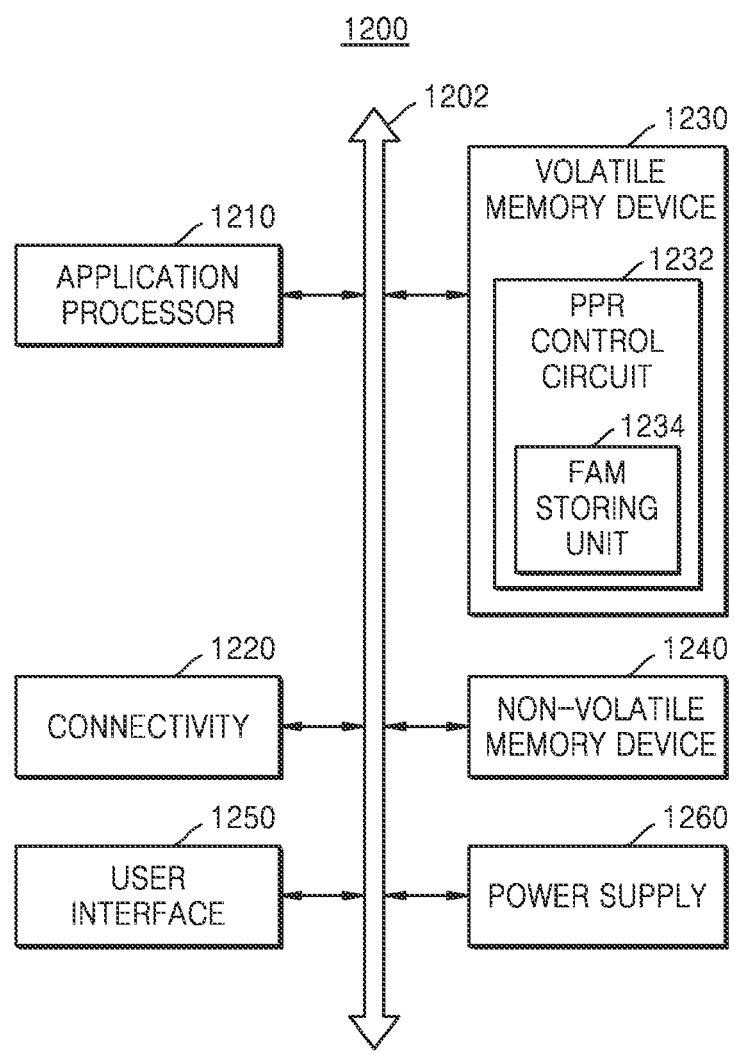
FIG. 13 illustrates a block diagram of an example in which a memory device including a PPR control circuit is applied to a mobile system, according to embodiments of the inventive concepts.

FIG. 13 illustrates a block diagram of an example, in which memory devices including a PPR control circuit 1232 is applied to a mobile system 1200, according to embodiments of the inventive concepts.

Referring to FIG. 13, the mobile system 1200 may include an application processor 1210, a connectivity unit or circuit 1220, a first memory device 1230, a second memory device 1240, a user interface 1250, and a power supply 1260, which are connected to each other via a bus 1202. The first memory device 1230 may be set with a volatile memory, and the second memory device 1240 may be set with a non-volatile memory.

According to some embodiments, the mobile system 1200 may include any mobile system, such as for example a mobile phone, a smart phone, a personal digital assistant (PDA), a portable multimedia player (PMP), a digital camera, a music player, a portable game console, and a navigation system or the like.

The application processor 1210 may execute applications that provide Internet browsers, games, animations, etc. According to an embodiment, the application processor 1210 may include a single processor core (single core) or a plurality of processor cores (multi-core). For example, the application processor 1210 may include a dual-core, a quad-core, and a hexa-core. In addition, according to an embodiment, the application processor 1210 may further include a cache memory arranged internally or externally.

The connectivity unit 1220 may perform a wireless communication or a wired communication with an external device. For example, the connectivity unit 1220 may perform Ethernet communication, near field communication (NFC), radio frequency identification (RFID) communication, mobile telecommunication, memory card communication, universal serial bus (USB) communication, etc. For example, the connectivity unit 1220 may include a baseband chipset, and support communication, such as GSM, GRPS, WCDMA, and HSxPA.

The first memory device 1230 which is a volatile memory, may store data processed by the application processor 1210 as write data, or operate as a working memory. The first memory device 1230 may include the PPR control circuit 1232 which controls performing of the PPR operation. The PPR control circuit 1232 may store the defective address FAM in the FAM storing unit 1234 according to the PPR/ hPPR command. The FAM storing unit 1234 may include a non-volatile memory or a volatile memory. The PPR control circuit 1234 may perform the PPR operation of writing data in the redundancy memory cells connected to the redundancy word line replacing the defective word line selected by a defective row address, or writing data in the redundancy memory cells connected to the redundancy word line replacing the defective word line selected by a defective column address. In the redundancy memory cells, data of the memory cells connected to the defective word line may be written by using an internal bank copy operation or an inter-bank copy operation, or data '0' or data '1' may be written.

The second memory device 1240 which is a non-volatile memory, may store a boot image for booting the mobile system 1200. For example, the second memory device 1240 may be implemented as electrically erasable programmable read-only memory (ROM) (EEPROM), flash memory, phase change RAM (PRAM), resistance RAM (RRAM), nano-floating gate memory (NFGM), a polymer RAM (PoRAM), magnetic RAM (MRAM), ferroelectric RAM (FRAM), or memory similar thereto.

The user interface 1250 may include one or more input devices, such as a keypad and touch screen, and/or a speaker, a display device, and one or more output devices. The power supply 1260 may supply an operation voltage. In addition, according to some embodiments, the mobile system 1200 may further include a camera image processor (CIP) (not shown), and may further include a storing unit (not shown), such as a memory card, a solid state drive (SSD), a hard disk drive (HDD), and compact disc (CD) ROM (CD-ROM).

Figure 14:
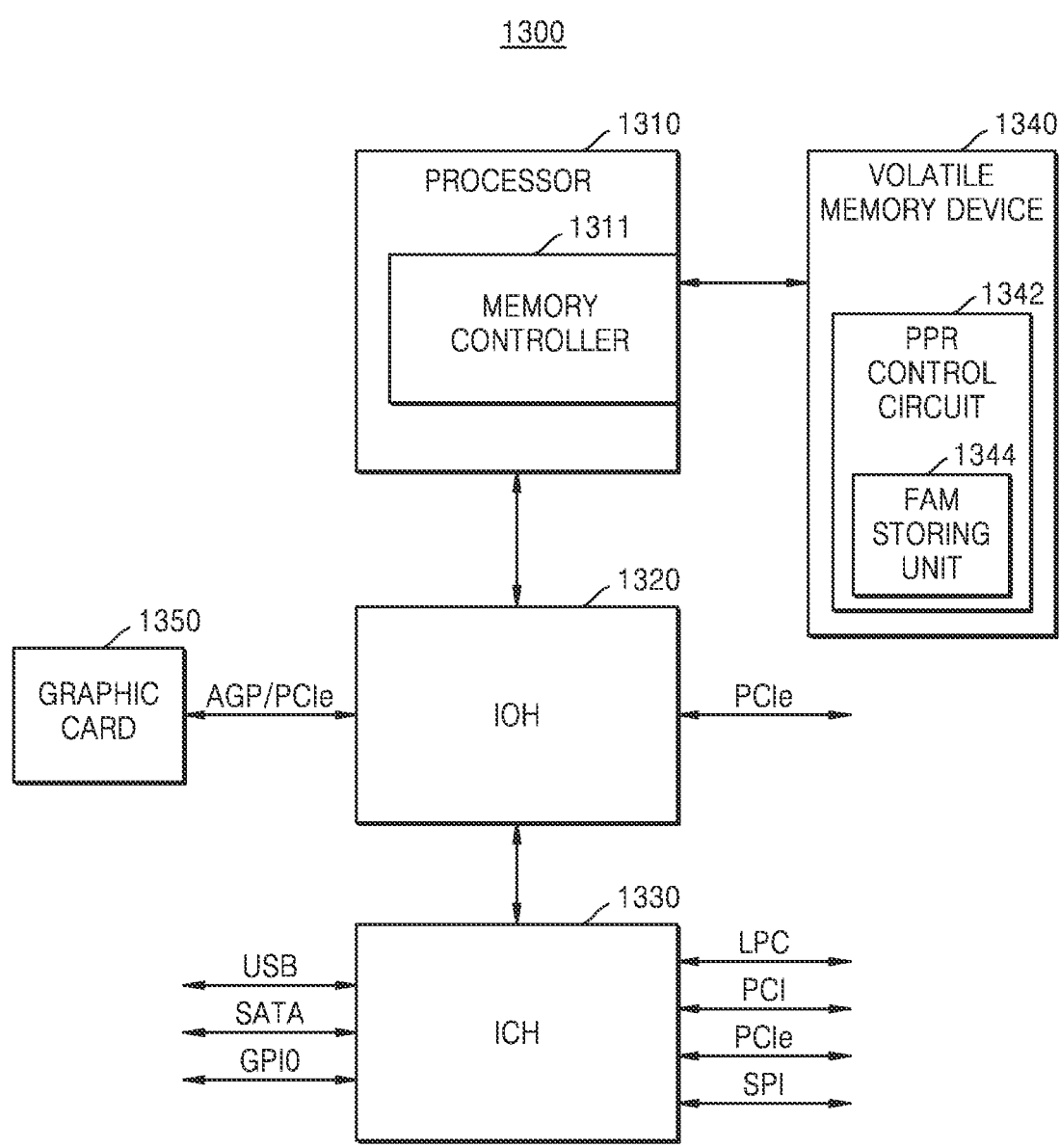
FIG. 14 illustrates a block diagram of an example in which a memory device including a PPR control circuit is applied to a computing system, according to embodiments of the inventive concepts.

FIG. 14 illustrates a block diagram of an example, in which a memory device 1340 including a PPR control circuit 1342 is applied to a computing system 1300, according to embodiments of the inventive concepts.

Referring to FIG. 14, the computer system 1300 may include a processor 1310, an input/output hub (IOH) 1320, an input/output controller hub (ICH) 1330, a memory device 1340, and a graphics card 1350. According to an embodiment, the computer system 1300 may include an arbitrary computing system such as for example a personal computer (PC), a server computer, a workstation, a laptop, a mobile phone, a smart phone, a personal digital assistant (PDA), a portable multimedia player (PMP), a digital camera, a digital television, a set-top box, a music player, a portable game console, and a navigation system or the like.

The processor 1310 may execute various computing functions, such as particular calculations or tasks. For example, the processor 1310 may include a microprocessor or a central processing unit (CPU). According to an embodiment, the processor 1310 may include a single processor core or a plurality of processor cores (multi-core). For example, the processor 1310 may include a dual-core, a quad-core, a hexa-core, etc. In addition, in some embodiments the computing system 1300 may include a plurality of processors 1310. In addition, according to some embodiments, the processor 1310 may further include a cache memory arranged internally or externally.

The processor 1310 may include a memory controller 1311 controlling an operation of the memory device 1340. The memory controller 1311 included in the processor 1310 may be referred to as an integrated memory controller (IMC). According to some embodiments, the memory controller 1311 may instead be disposed in the IOH 1320. The IOH 1320 including the memory controller 1311 may be referred to as a memory controller hub (MCH).

The memory device 1340 may include the PPR control circuit 1342, which controls the PPR operation. The PPR control circuit 1342 may store the defective address FAM in a FAM storing unit 1334 according to the PPR/hPPR command. The FAM storing unit 1344 may include a non-volatile memory or a volatile memory. The PPR control circuit 1344 may perform the PPR operation of writing data in the redundancy memory cells connected to the redundancy word line replacing the defective word line selected by a defective row address, or writing data in the redundancy memory cells connected to the redundancy word line replacing the defective word line selected by a defective column address. In the redundancy memory cells, data of the memory cells connected to the defective word line may be written by using an internal bank copy operation or an inter-bank copy operation, or data '0' or data '1' may be written.

The IOH 1320 may manage data transmission between devices such as the graphics card 1350 and the processor 1310. The IOH 1320 may be connected to the processor 1310 via various types of interfaces. For example, the IOH 1320 may be connected to the processor 1310 via various standard interfaces, such as a front side bus (FSB), a system bus, the HyperTransport, a lightning data transport (LDT), the QuickPath Interconnect (QPI), a common system interface, and a peripheral component interface-express (CSI). According to some embodiments, the computing system 1300 may include a plurality of input/output controller hubs IOH.

The IOH 1320 may provide various interfaces with various devices. For example, the IOH 1320 may provide an accelerated graphics port (AGP) interface, a peripheral component interface-express (PCIe), a communications streaming architecture (CSA), etc.

The graphics card 1350 may be connected to the IOH 1320 via the AGP interface or the PCIe interface. The graphics card 1350 may control a display device (not shown) for displaying an image. The graphics card 1350 may include an internal processor and an internal semiconductor memory device for processing image data. According to some embodiments, the IOH 1320 may include a graphics device together with the graphics card 1350 arranged outside the IOH 1320, or instead together with the graphics card 1350 inside the IOH 1320. The graphics device included in the IOH 1320 may be characterized as an integrated graphics device. In addition, the IOH 1320 including a memory controller and a graphics device may be characterized as a graphics and memory controller hub (GMCH).

The ICH 1330 may perform data buffering and interface mediation so that various system interfaces operate efficiently. The ICH 1330 may be connected to the IOH 1320 via an internal bus. For example, the IOH 1320 may be connected to the ICH 1330 via a direct media interface (DMI), an hub interface, an enterprise south bridge interface (ESI), PCIe, etc.

The ICH 1330 may provide various interfaces with periphery devices. For example, the ICH 1330 may provide a USB port, a serial advanced technical attachment (SATA) port, a general purpose input/output (GPIO), a low pin count (LPC) bus, a serial peripheral interface (SPI), PIC, PCIe, etc.

According to some embodiments, two or more components of the processor 1310, the IOH 1320, and the ICH 1330 may be implemented as one chipset.

While the inventive concepts have been particularly shown and described with reference to various embodiments, it should be understood that various changes in form and detail may be made therein without departing from the spirit and scope of the following inventive concepts.

What is claimed is:

1. A memory system comprising a memory device configured to receive a plurality of signals including a post package repair command from a host,
   wherein the memory device comprises:
   a memory cell array including a plurality of memory cells connected to a plurality of word lines and a plurality of bit lines and a plurality of redundancy memory cells connected to one or more redundancy word lines and the plurality of bit lines,
   an anti-fuse array configured to store a plurality of data values related to at least one of a position of a defective memory cell, a row address for the defective memory cell, or dirty fuse data indicating whether each of the plurality of memory cells is defective; and
   a post package repair (PPR) control circuit configured to transmit to the host an indication of whether a PPR operation on the defective memory cell has passed,
   wherein the PPR control circuit is configured to:
   determine a target which is an object of the PPR operation in the memory cell array,
   compare a first data value stored in the anti-fuse array for the target before the PPR operation with a second data value stored in the anti-fuse array for the target after the PPR operation, to obtain a comparison result, and
   determine whether the PPR operation has passed based on the comparison result.

2. The memory system of claim 1, wherein the PPR control circuit is configured to determine that the PPR operation has failed based on the second data value for the target after the PPR operation being equal to the first data value for the target before the PPR operation.

3. The memory system of claim 2, wherein the PPR control circuit is configured to transmit an alert signal to the host when the PPR operation has failed.

4. The memory system of claim 3, wherein the memory device is configured to receive a retry signal for retrying the PPR operation based on transmitting the alert signal.

5. The memory system of claim 1, wherein the PPR control circuit comprises a first transistor configured to receive the first data value of the target before the PPR operation as a first signal, a second transistor configured to receive the second data value of the target after the PPR operation as a second signal, and a logic gate configured to compare the first signal with the second signal.

6. The memory system of claim 5, wherein the logic gate comprises an XOR gate, and wherein the PPR control circuit is configured to generate a failure signal based on the first signal being equal to the second signal.

7. The memory system of claim 1, wherein the memory device further comprises normal fuse memory cells having different electrical characteristics from anti-fuse memory cells included in the anti-fuse array, and wherein the PPR control circuit is configured to perform the PPR operation on the normal fuse memory cells.

8. An operating method of a memory system including a memory controller and a memory device including a memory cell array and an anti-fuse array, the memory cell array comprising a plurality of memory cells, the operating method comprising:
   receiving, from a host, a request for a post package repair (PPR) operation on a defective memory cell of the memory cell array;
   performing the PPR operation responsive to the request the PPR operation by the host; and
   storing, in the anti-fuse array, a plurality of data values related to at least one of a position of the defective memory cell, a row address for the defective memory cell, or dirty fuse data indicating whether each of the plurality of memory cells is defective;
   wherein the performing of the PPR operation comprises:
   determining a target which is an object of the PPR operation from the memory cell array;
   comparing a first data value stored in the anti-fuse array for the target before the PPR operation and a second data value stored in the anti-fuse array for the target after the PPR operation, to obtain a comparison result; and
   determining a status of the PPR operation as passed or failed based on the comparison result.

9. The operating method of claim 8, wherein the determining the status of the PPR operation comprises determining the status of the PPR operation is failed based on the comparison result indicating that the second data value for the target after the PPR operation is equal to the first data value for the target before the PPR operation.

10. The operating method of claim 9, comprising transmitting an alert signal to the host based on the status of the PPR operation being failed.

11. The operating method of claim 10, further comprising:
receiving, from the host, a retry signal for the PPR operation in response to the transmitting of the alert signal; and
performing another PPR operation on the target responsive to the retry signal.

12. The operating method of claim 8, wherein the comparing the first data value and the second data value comprises:
receiving, by a first transistor, the first data value for the target before the PPR operation as a first input, and receiving, by a second transistor, the second data value for the target after the PPR operation as a second input; and
comparing, by a logic gate, the first input with the second input.

13. The operating method of claim 12, wherein the logic gate is an XOR gate, and the determining the status of the PPR operation comprises generating a failure signal by the XOR gate based on the first input being equal to the second input.

14. The operating method of claim 8, wherein the performing the PPR operation further comprises performing the PPR operation on normal fuse memory cells having different electrical characteristics from anti-fuse memory cells included in the anti-fuse array.

15. A controller of a memory device, the memory device comprising a memory cell array including a plurality of memory cells, an anti-fuse array storing a plurality of data values related to at least one a position of a defective memory cell, a row address for the defective memory cell, or dirty fuse data indicating whether each of the plurality of memory cells is defective, and a post package repair (PPR) control circuit, wherein the controller is disposed in a host distinct from the memory device,
the controller configured to:
generate a PPR command signal requesting a PPR operation on the defective memory cell of the memory cell array which is a target for the PPR operation,
transmit the PPR command signal to the memory device, and
receive a performance result of the PPR operation on the target from a PPR control circuit of the memory device responsive to the PPR command signal,
the performance result based on comparison of data values stored in the anti-fuse array for the target before and after-the PPR operation.

16. The controller of claim 15, wherein the controller is configured to transmit a retry signal to the memory device requesting a second PPR operation on the target based on the performance result.

17. The controller of claim 15, wherein the performance result indicates failure of the PPR operation based on a first data value for the target before the PPR operation being equal to a second data value for the target after the PPR operation.

18. The controller of claim 15, wherein the performance result indicates passing of the PPR operation based on a first data value for the target before the PPR operation being different from a second data value for the target after the PPR operation.

19. The controller of claim 15, wherein the controller is configured to receive an alert signal from the PPR control circuit as the performance result based on the PPR operation having failed.

20. The controller of claim 15, wherein the PPR command signal requests storage of an address of the defective memory cell in a defective address storage unit of the memory device.

* * * * *